No. 881,510. PATENTED MAR. 10, 1908.
L. E. WARREN & A. ANDERSON.
FRICTION CLUTCH.
APPLICATION FILED MAR. 12, 1907.
2 SHEETS—SHEET 1.
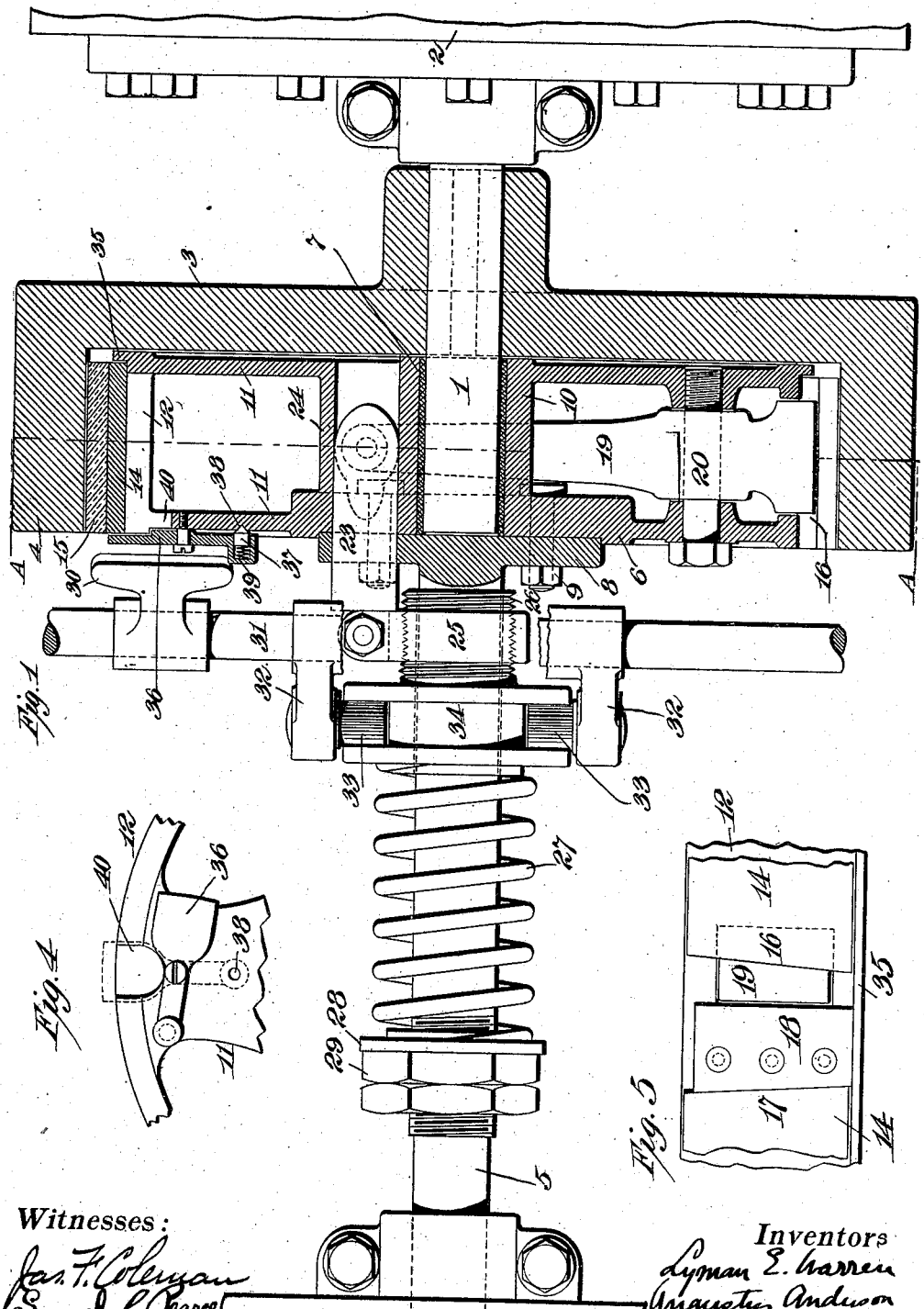
Witnesses:
Inventors No. 881,510. PATENTED MAR. 10, 1908.
L. E. WARREN & A. ANDERSON
FRICTION CLUTCH.
APPLICATION FILED MAR. 12, 1907.
2 SHEETS—SHEET 2.
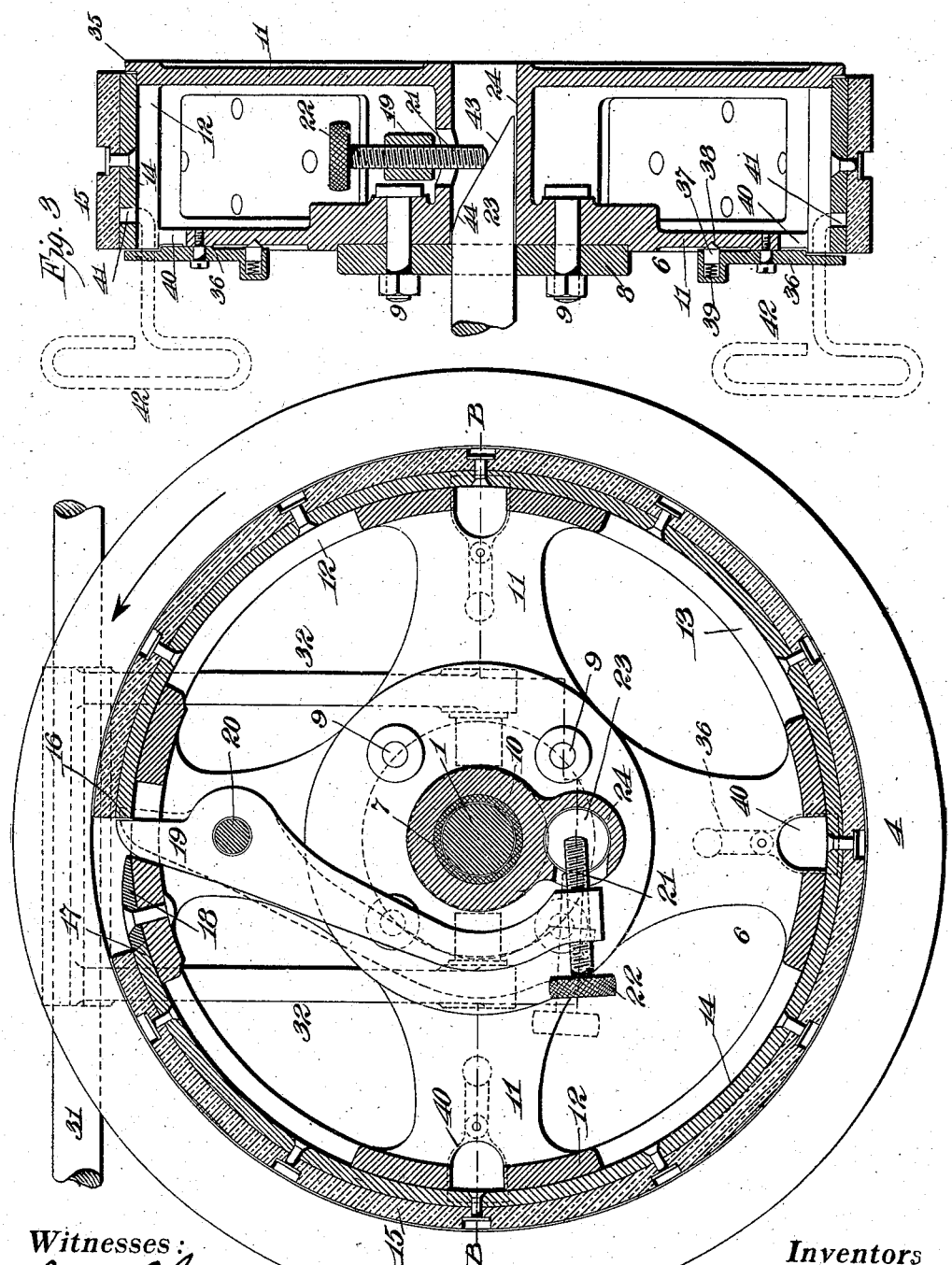
Witnesses:
Inventors

UNITED STATES PATENT OFFICE.

LYMAN E. WARREN AND AUGUSTUS ANDERSON, OF NEW YORK, N. Y.

FRICTION-CLUTCH.

No. 881,510.   Specification of Letters Patent.   Patented March 10, 1908.

Application filed March 12, 1907. Serial No. 361,909.

*To all whom it may concern:*

Be it known that we, LYMAN E. WARREN, a citizen of the United States, and AUGUSTUS ANDERSON, a citizen of the United States, both residents of the borough of Manhattan, city, county, and State of New York, have invented an Improvement in Friction-Clutch, of which the following is a specification.

The object we have in view is the production of a friction clutch for connecting a driving member to a driven member, which clutch will be adjustable for wear, and which will have a wearing member which may be removed so that a new member may be substituted.

A further object is to produce a clutch working with an expanding band, on an internal rim and so arranged that it will not jam.

We attain these objects by the mechanism illustrated in the accompanying drawings, in which Figure 1 is a longitudinal partial sectional view of a driving shaft, fly wheel, driven shaft and clutch embodying our invention. Fig. 2 is a section on the line A A of Fig. 1. Fig. 3 is a view of a portion of the structure shown in Fig. 1, at right angles thereto, and taken on the line B B of Fig. 2. Fig. 4 is a detail view of a portion of the device. Fig. 5 is a detail view.

In all of the several views, like parts are designated by the same reference characters.

The drawings show the embodiment of our invention as applied to a clutch for automobile work and we describe in detail such embodiment, it being understood that our invention is in no way limited to such use, as it may be used in any situation where it is desirable to make a connection between two rotating shafts.

In the drawing, 1 is the driving shaft, 2 is a portion of the motor, and 3 is the fly wheel. The fly wheel 3 is formed with an overhanging flange 4, the inner face of which constitutes a friction surface. This construction therefore comprises a driving member with an internal bearing surface. The driven shaft 5 is in line with the driving shaft 1; it is connected to the drum 6 and is rotated by the latter. This drum 6 lies within the overhanging flange 4, and is mounted to turn freely upon the driving shaft 1; the bearing between the drum and the driving shaft is babbitted at 7 to permit this to be done. The end of the driven shaft 5 is provided with a flange 8, which is secured to the drum by means of bolts 9.

The drum 6 is preferably made of a single casting, and comprises a hub 10, spokes 11 and a rim 12. This rim as shown is provided with a number (four in this instance) of openings, which are for the purpose of decreasing the weight.

The band 14 rests upon the rim 12 and is adapted to be expanded so as to frictionally engage the inner surface of the overhanging flange 4. The band 14 may be made of steel or other metal and used alone, or in combination with an outside leather band 15, which is riveted to the band 14. Other material may be used instead of leather.

The band 14 is not continuous, but is provided with an opening between its ends (see Fig. 2). This opening is preferably as large as the diameter of the driven shaft, 5, so that when the band is removed from the drum 6 it may be removed from the machine, it being slipped with its opening over the driven shaft 5. The two ends 16 and 17 of the band 14 are a sufficient distance apart to admit the fixed abutment 18 and the lever 19, which constitutes a movable abutment. The fixed abutment 18 is riveted or otherwise secured to the rim 12. The lever 19 is pivoted at 20 between two of the spokes 11. The inner end of the lever, which is shown as much longer than the outer end is provided with a bolt 21. This bolt is shown as provided with a milled head 22 so that the length of the bolt extending beyond one side of the lever 19 may be adjusted and the effective length of the lever 19 thereby controlled. The other end of the bolt is adapted to engage with a cam 23. This cam 23 is of circular cross section as shown in Fig. 2. It works in a tubular guide 24, which is shown as being integral with the hub 10. An opening in one side of the tubular guide permits the passage of the bolt 21, so that it may be engaged by the working face of the cam 23. The other end of the cam 23 is bolted to the ring 25. This ring 25 is threaded upon a sleeve 26 which may be rotated to adjust the position of the cam toward and away from the drum 6, to adjust for wear or breakage of the cam 23. This sleeve is moved toward the drum by means of a spring 27 which surrounds the driven shaft 5 and abuts against the washer 28, which is adjusted as to position by means of the nuts 29. By adjusting the position of the washer 28 the tension of the spring 27 is controlled. The sleeve 26 is moved in the direction away from the drum by means of a pedal 30, which is arranged within convenient reach of the operator, and is shown as mounted on the transverse shaft 31. Suitable levers 32 depend from the transverse shaft and carry rollers 33 which enter a groove 34, on the sleeve 26. By moving the pedal 30, the shaft 31 is given a partial rotation, swinging the levers 32 and moving the sleeve 26 in a direction away from the drum 6, compressing the spring 27, and drawing the cam 23 outward. This movement will permit the bolt 21 to ride down the inclined face of the cam, swinging the lever 19 upon its pivot, from the dotted line position, shown in Fig. 2, to the full line position. By releasing the pressure of the pedal, the spring 27 will force the cam 23 inward, causing the bolt 29 to ride up the inclined face of the cam, pivoting the lever 19 and moving it to the dotted line position, Fig. 2. This will have the effect of expanding the band 14 and forcing it against the inner surface of the overhanging flange 4. This will couple the shafts 1 and 5 together to any extent desired, as it depends upon the pressure exerted by the spring 27. By means of the milled head 22 the effective length of the bolt 21 can be controlled, which will take up all wear which may occur on the band and inside face of the overhanging flange of the fly wheel. By adjusting the tension of the spring 27 by means of the nuts 29, the degree of pressure caused by the band engaging with the flange may be controlled.

The cam 23 as shown is provided with a working face arranged at two angles, one face 43 is at a greater angle than the other face 44. The face 43 is adapted to engage with the bolt 41 before the face 44 engages. The angle of the face 43 being greater than that of the face 44 will move the bolt 21 with greater speed and less power than the face 44. By this construction the face 43 is first moved into engagement with the bolt 21 and the lever 19 is moved during a considerable arc of movement at greater speed than during the latter part of its arc of travel, such latter part being moved by the engagement of the bolt 21 with the face 44, hence the lever 19 will be moved with greater power toward the end of its travel than at the beginning. This is advantageous at it allows the band to be engaged against the overhanging rim with gradually increasing power.

The band 14 is so arranged upon the drum that it may be removed without taking the mechanism apart. This we accomplish by providing the rim of the drum with a permanent flange on one side and a removable or adjustable flange on the other. The permanent flange 35 is on the side of the drum which lies against the fly wheel 3. The adjustable flange, as shown in this embodiment of our invention, consists of a number of pivoted fingers 36. These fingers are pivoted to the outside of three of the spokes 11. When in the dotted line position, shown in Fig. 4, a finger extends above the line of the flange 12 a sufficient distance to securely hold the band in position. When moved to the full line position in Fig. 4 the band may be slipped off in a longitudinal direction by a movement parallel to the axis of the drum. To hold the fingers in position, each is provided with a latch, which consists of a sliding bolt 37, forced into an opening 38, in the spoke 11, by means of a small spiral spring 39. The spokes are cut away, to provide openings 40 adjacent to the fingers 36, and an opening is made in the flange 8 adjacent to each opening 40. The band is provided with an opening or socket 41 adjacent to each opening 40. By introducing a tool 42, shown in broken lines in Fig. 3, on opposite sides of the drum through the openings 40 and engaging within the opening or socket 41, the band may be moved in a direction parallel to the axis of the drum and then may be moved from the machine by moving it to one side, the opening between the ends 16 and 17 being sufficiently large to permit this to be done. If necessary this opening can be increased for this purpose, as the band is elastic. The ends 16 and 17 of the band 14 are inclined as shown in Fig. 5, and the abutment 18 and lever 19 are similarly inclined so that the driving stress will tend to force the band towards the permanent flange 35, thus holding the ends of the band in position.

A third portion of our invention consists in making a clutch with an expanding band so arranged that it will not jam. As shown in Fig. 2 the fly wheel and shaft 1 turn in the direction of the arrow or opposite to the hands of a clock. When the band is expanded and the parts of the clutch coupled together, the drum will rotate in the same direction. When the band is expanded, being moved between the lever or movable abutment 19 and the fixed abutment 18, it will expand outward. Upon releasing the clutch, the rotary stress between the overhanging flange and the band will tend to force the band against the moving abutment, and the latter being at this time free to move will permit the clutch to readily free itself. The ordinary practice in connection with clutches having expanding bands, so far as we are aware, is to arrange them in the opposite manner, in which the movable abutment travels ahead of the fixed abutment. Such being the case the rotating stress between the overhanging flange and the band drives against the fixed abutment and not against the moving abutment. When the clutch is released therefore, there is a tendency for it to stick and not to turn the lever 19 upon its pivot, as is the case with our clutch. In accordance with the provisions of the patent statutes, we have described the principle of our invention, together with the apparatus which we now consider to represent the best embodiment thereof; but we desire to have it understood that the apparatus shown is merely illustrative and that the invention can be carried out in other ways.

Having now particularly described our invention, what we claim and desire to secure by Letters Patent is:

1. A clutch having a member with a friction surface, and a separate drum and an expanding band, the said drum carrying a permanent flange and an adjustable flange.

2. A clutch having a member with a friction surface, and a separate drum and an expanding band, the said drum carrying a fixed flange and a button, which constitutes a means for assisting the fixed flange in holding the band in place.

3. A clutch having a member with a friction surface, and a separate drum and an expanding band, the said drum carrying a fixed flange on one side and a pivoted button on the other, the said button having a latch for securing it in position.

4. A clutch which comprises a driving member, having an internal bearing surface, a driven member having an expanding band, a fixed and an adjustable flange on the driven member for confining the band, means for expanding the band against the bearing surface, the said means comprising a fixed abutment and a moving abutment; the fixed abutment being located beyond the moving abutment in relation to the direction of the rotation of the parts, whereby the clutch will drive against the moving abutment.

5. A clutch which has an interrupted expanding band, and a drum with abutments, and an adjustable and a permanent flange confining the band, the abutments and ends of the band being inclined, so that the working stress will force the band toward the permanent flange, and hold it in place.

6. A clutch having a driving member and a driven member, an expanding band between the members, a flange on one side of one of the members, an adjustable, interrupted flange on the other side of the member, the expanding band being confined between the flanges, the band carrying means whereby it may be removed from between the members without disturbing the members.

7. A clutch having a driving member and a driven member, an expanding band between the members, sockets in the band to facilitate the removal of the band, and a gap in one of the members permitting access to the sockets.

8. A clutch having a driving member and a driven member, an expanding band between the members, sockets in the band to facilitate the removal of the band, gaps in one of the members permitting access to the sockets and covers for the gaps.

9. A clutch having a driving and a driven member, an expanding band between the members, sockets in the band to facilitate the removal of the band, gaps in one of the members permitting access to the sockets, covers for the gaps and means for locking the covers in position.

10. A clutch having a driving and a driven member, an expanding band between the members, sockets in the band to facilitate the removal of the band, gaps in one of the members permitting access to the sockets, pivoted covers for the gaps and spring locks for securing the covers in position.

11. A clutch having a drum and an expanding band, of means for expanding the band, such means including a cam and a lever, means for adjusting the effective length of the lever, means for adjusting the length of the cam and a spring acting on the cam.

This specification signed and witnessed this 11th day of March, 1907.

LYMAN E. WARREN.
AUGUSTUS ANDERSON.

Witnesses:
LEONARD H. DYER,
JOHN L. LOTSCH.